United States Patent Office 3,198,793
Patented Aug. 3, 1965

3,198,793
6-DIBENZO(c,e)-o-THIAZINE-5-DIOXIDE AND PROCESSES FOR THEIR PRODUCTION
Josef Hilger and Friedrich Muth, Leverkusen-Bayerwerk, Germany, assignors to Farbenfabriken Bayer Aktiengesellschaft, Leverkusen, Germany, a German corporation
No Drawing. Filed Sept. 26, 1961, Ser. No. 140,701
Claims priority, application Germany, Sept. 27, 1960, F 32,211
9 Claims. (Cl. 260—243)

The present invention relates to and has as its objects new and useful insecticidal agents especially with outstanding activities against moths and other textile pests and processes for the production thereof. Generally the new compounds of this invention may be represented by the following formula

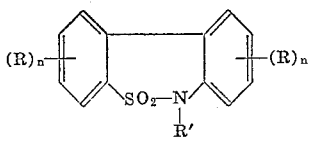

In this formula, R represents a halogen atom, a trifluoromethyl, alkyl, alkoxy, nitro, cyano, thiocyanate, alkylsulfamide, or arylsulfone group, also the residue from a (thio)urea or carbaminic acid ester, whilst R' denotes hydrogen, a preferably lower alkyl residue or any acyl radical, preferably a lower aliphatic acyl radical or sulfonyl radical and $n$ an integer from 1 to 4.

From a paper by F. Ullmann and C. Gross (Ber. dtsch. chem. Ges. 43, 2694–2704 (1910)), it is already known that the 2-nitrobenzene-sulfanilide formed from 2-nitrobenzene sulfonic acid chloride and aniline can be reduced by means of stannous chloride in an acidic, aqueous alcoholic solution, and that the reduction product, 2-aminobenzene-sulfanilide, can readily be diazotized. By addition of sodium acetate to the diazonium salt solution the stated authors obtained N-phenyl-benzene-sulfone triazine, which they were able to convert to the sultam of 2' - aminodiphenyl - sulfonic acid - (2) or biphenylene sultam of the formula

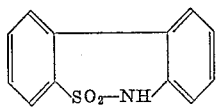

by means of treatment with sodium hydroxide solution and copper.

By the same method, Ullmann and Gross also prepared the corresponding naphthylene-phenylene sultam.

In accordance with the present invention it has now been found that 2-aminobenzene-sulfanilides substituted at the nucleus by halogen atoms and/or trifluoromethyl groups are, surprisingly, also subject to the ring closure reaction according to Ullmann and Gross. For this purpose, substituted 2-nitrobenzene-sulfonic acid chlorides, optionally substituted by halogen and/or trifluoromethyl groups, are reacted with primary or secondary anilines, which may also be substituted at the nucleus by halogen and/or trifluoromethyl residues, at least one of the starting components containing one halogen atom or one trifluoromethyl group, to give the corresponding 2-nitrobenzene-sulfanilides, the latter are reduced to 2-aminobenzene-sulfanilides, the reaction products are diazotized, the diazonium salts are converted to the corresponding N-phenyl-benzene-sulfone-triazine substituted by halogen and/or trifluoromethyl, e.g. by means of sodium acetate, and the latter are finally converted (e.g. by copper in alkaline solution) to the corresponding derivatives of 6-dibenzo (c,e)=o=thiazine=5=dioxide (numbering of the substituents in accordance with M. Patterson and L. T. Capell, Ring Index 1940/p. 253). In the case of secondary amines the diazo compound can be directly converted into the corresponding derivative of the 6-dibenzo compound by reaction with caustic soda and copper powder.

Such behavior of the substituted 2-aminobenzene-sulfanilides could not have been foreseen; instead, it was to be expected that, particularly in the case of polyhalogenated 2-aminobenzene-sulfanilides, the large volume of the halogen atoms or trifluoromethyl groups would impede ring closure for steric reasons.

The sequence of the reactions may be indicated by the following equations:

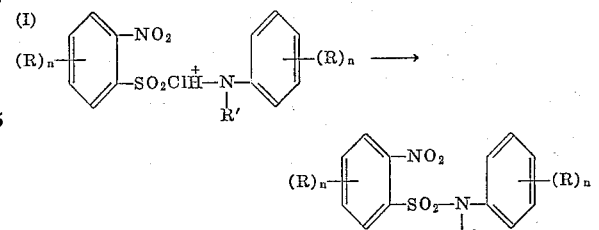

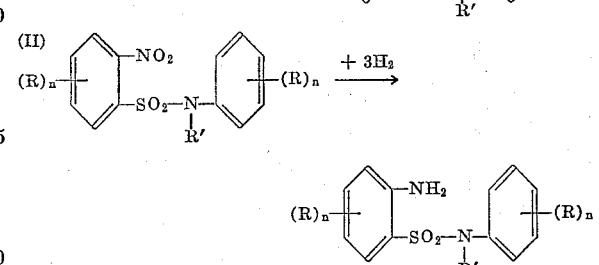

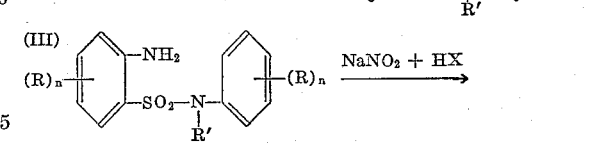

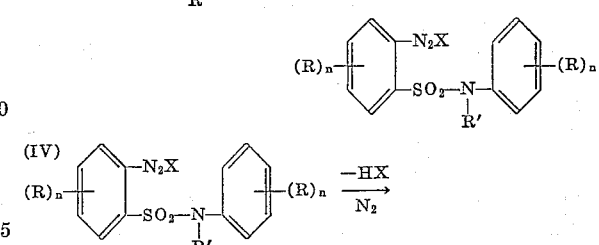

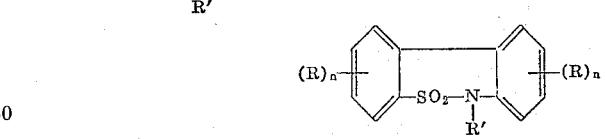

In the above equations, R, R', and $n$ have the aforementioned significance, whilst X represents the residue from a mineral acid.

In addition it has been found that instead of using secondary anilines as starting materials, it is also possible to carry out subsequent replacement of the hydrogen atom still remaining on the nitrogen in the case of compounds obtained by the process according to the invention when 2-nitrobenzene-sulfonic acid chlorides, optionally subtituted by halogen and/or trifluoromethyl, are reacted with primary anilines, optionally substituted by halogen and/or trifluoromethyl, by the corresponding alkyl or acyl residues on treatment with alkylating or acylating agents.

Moreover, it is possible to introduce halogen atoms and/or nitro groups or such additional groups into the benzene nuclei of the derivative of 6-dibenzo(c,e)-o-thianzine-5-dioxide by subsequent halogenation and/or nitration.

The new compound of this invention distinguish themselves by a good activity against moths and other textile pests. Moreover, they exhibit a general pesticidal (insecticidal) activity. In the latter respect they may be used in the same manner as other known compounds, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethylketone, liquid hydrocarbons and the like. The new compounds may furthermore be used in combination with each other or with known insecticides, fertilizers, etc.

The special utility of the inventive compounds, however, is in the field of the protection of keratinic material against the attack of moths and other textile pests. In contrast to biphenylene sultam itself, which does not possess any pesticidal properties, the compounds obtainable according to this invention are characterized by strong activity towards keratin pests and other harmful insects. The products of the process are therefore preferably intended for use in the protection of materials containing keratin particularly against moths and also against Anthrenus and Attagenus beetles. This is to be seen from the following example:

Textile material consisting of wool or fibres containing wool are treated in an acidic or neutral dyeing pitch with a solution of the sodium salt of 7.9.10-trichloro-6-dibenzene-(c,e)-o-thiazine-5-dioxide in an amount of 0.1 to 0.3% calculated on the weight of textile material. The treatment is carried out at first at temperatures of 30° C. and the temperature is slowly raised up to about 100° C. Textile material treated in this way is completely resistant against eating by keratin pests such as moths or larvae of Anthrenus and Attagenus beetles.

The following examples are given to illustrate the present invention without, however, limiting it in any way.

Example 1

221 parts by weight of 2-nitrobenzene-sulfonic acid chloride are introduced by small portions into 260 parts by weight of 3-chloroaniline whilst stirring and heating slightly. The temperature of the mixture rises to 120° C. during this process. After the exothermal reaction has subsided, it is further heated at 90–95° C. for 1 hour, and 15% of hydrochloric acid is then added until there is a definite acidic reaction towards Congo red (about 200 parts by volume).

After prolonged stirring, the reaction product which separates in solid form is filtered off by suction, and the hydrochloride of excess 3-chloroaniline, which is also produced, is removed by washing with hot water. After the residue has been dried, there are obtained 287 parts by weight of 2'-nitro-benzene-sulfonyl-3-chloro-anilide. When recrystallized from alcohol, the product forms needles of M.P. 121–122° C.

The crude 2'-nitrobenzene-sulfonyl-3-chloro-anilide is slowly introduced, with stirring, into a solution of 750 parts by weight of stannous chloride in 1500 parts by volume of alcohol. Thereafter, 750 parts by volume of hydrochloric acid are added, and a vigorously exothermal reaction ensues. To complete the reaction, it is heated to boiling for another hour, a part of the alcohol is distilled off, and finally 2'-amino-benzene-sulfonyl-3-chloroanilide hydrochloride is precipitated by addition of 300 parts by volume of concentrated hydrochloric acid.

When the mixture has cooled, it is filtered with suction, the resultant residue is treated with 2500 parts by volume of water then with 40% sodium hydroxide solution until it has acquired a definitely alkaline reaction (about 275 parts by volume), it is heated at 90–95° C. for a short time after the addition of animal charcoal, it is filtered off, and after being cooled to 40° C., the free base is precipitated by the addition of acetic acid. After recrystallization from alcohol, 2'-aminobenzene-sulfonyl-3-chloroanilide has a melting point of 107–108° C.

26.5 parts by weight of 2'-aminobenzene-sulfonyl-3-chloroanilide are dissolved at 20° C. in 700 parts by volume of water and about 9 parts by volume of concentrated sodium hydroxide solution. 35 parts by volume of 10% sodium nitrite solution are added to this solution, and the mixture is then allowed to run gradually into a mixture of 125 parts by volume of water, 25 parts by volume of concentrated hydrochloric acid, and 25 parts by volume of glacial acetic acid. A part of the diazonium salt crystallizes out after being stirred for an hour. The correspondingly substituted N-phenyl-benzene-sulfone triazine is precipitated by addition of 30 parts by weight of sodium acetate, and then it is filtered by suction.

The product is suspended in a mixture of 350 parts by volume of water, 12 parts by volume of sodium hydroxide, and 1.5 parts by weight of copper, and the suspension is gradually heated to 90° C., with stirring, when vigorous evolution of nitrogen takes place. When a sample from the reaction mixture no longer indicates a coupling reaction with β-naphthol, it is filtered after the addition of charcoal, and 8-chloro-6-dibenzene(c,e)-o-thiazone-5-dioxide is precipitated from the filtrate by the addition of hydrochloric acid. After being recrystallized from benzene, the resulting crystals have a melting point of 155–158° C.

Example 2

111 parts by weight of 2-nitrobenzene-sulfonic acid chloride are gradually introduced, with stirring, into a solution of 80 parts by weight of 2,4-dichloroaniline in 120 parts by weight of pyridine, the temperature of the mixture rising up to 125° C. When the main reaction has subsided, it is warmed with stirring for another hour on the water bath, and the reaction product is thereafter precipitated by the addition of 250 parts by volume of hydrochloric acid.

The separated crystals are filtered from the mixture by suction whilst it is still hot, and are washed thoroughly with hot water. By this method, 149 parts by weight of 2'-nitrobenzene-sulfonyl-2,4-dichloroanilide are obtained. After being recrystallized from benzene, the compound melts at 122–123.5° C.

On reduction of the 2'-nitrobenzene-sulfonyl-2,4-dichloroanilide with a solution of 375 parts by weight of stannous chloride in 750 parts by volume of alcohol and 375 parts by volume of 15% hydrochloric acid, and when 375 parts by volume of alcohol have been distilled off and 150 parts by volume of hydrochloric acid have been added, 2'-aminobenzene-sulfonyl-2,4-dichloroanilide hydrochloride is obtained in crystalline form. The crystals are filtered off by suction and dissolved in hot water by the addition of sodium hydroxide solution. After being filtered off with added charcoal, the free 2'-aminobenzene-sulfonyl-2,4-dichloroanilide is precipitated from the filtrate by glacial acetic acid. Yield 223 parts by weight. M. P. after recrystallization from alcohol 108–110° C.

70 parts by volume of 10% sodium nitrite solution are added to 29 parts by weight of the resultant amino compound in solution in 250 parts by volume of alcohol.

The resultant mixture is stirred gradually, at 0–5° C. into a solution of 40 parts by volume of hydrochloric acid in water. The correspondingly substituted N-phenyl-benzene-sulfone-triazine is precipitated in crystalline form by the addition of 50 parts by weight of sodium acetate. After being filtered off by suction, the product is stirred with a mixture of 400 parts by volume of water, 11 parts by weight of sodium hydroxide, and 1.5 parts by weight of copper powder, and it is thereafter heated on the water bath. Vigorous evolution of nitrogen (frothing) takes place. When the reaction has ended, the resulting solution is decolorized by the addition of animal charcoal, filtered, and 9.7-dichloro-6-dibenzene(c,e,)-o-thiazine-5-dioxide is separated from the filtrate by the addition of glacial acetic acid. After being recrystallized from alcohol, the product has a melting point of 266–268° C.

*Analysis.*—Calc.: N, 4.7%; S, 10.7%. Found: N, 4.8%; S, 10.6%.

The resulting compound can be converted to 9.7-dichloro-6-dibenzo-(c,e)-6-methyl - o - thiazine-5-dioxide with dimethyl sulfate according to the procedure described in Example 4a. The methylated product crystallizes from glacial acetic acid in the form of needles with M.P. 230–231° C.

Example 3

When a solution of 200 parts by weight of 3.4.6-trichloroaniline in 240 parts by weight of pyridine is reacted with 221.0 parts by weight of 2-nitrobenzene-sulfonic acid chloride according to the method described in Example 2, 2′-nitrobenzene-sulfonyl-3.4.6-trichloro-anilide is obtained. After being recrystallized from alcohol, the product melts at 167–168° C.

The 2′-aminobenzene-sulfonyl-3.4.6-trichloroanilide obtained from it by reduction with stannous chloride in solution in aqueous alcoholic hydrochloric acid has a melting point of 107–109° C. after recrystallization from alcohol.

2′-aminobenzene-sulfonyl-3.4.6-trichloro-anilide is diazotized with sodium nitrite as described in Example 2, and the diazonium salt is converted to the corresponding sulfone triazine after the addition of sodium acetate. The latter, in alkaline solution is converted by copper powder with ring closure to 7.9.10-trichloro-6-dibenzene(c,e)-o-thiazine-5-dioxide which has a M.P. of 247–250° C. after being recrystallized from alcohol.

*Analysis.*—Calc.: N, 4.7%; S, 10.7%. Found: N, 4.56%; S, 10.83%.

Example 3a 7 parts by weight of 7.9.10-trichloro-6-dibenzene-(c,e)-o-thiazine-5-dioxide are dissolved in a mixture of water and acetone by addition of sodium hydroxide solution, and after 2.8 parts by weight of 1-bromobutane have been added, it is heated on the water bath for 8–10 hours. Thereafter, it is cooled with ice, the resultant precipitate is filtered off by suction, and recrystallized from petrol. The resultant 7.9.10-trichloro-6-dibenzene(c,e)-6-n-butyl-o-thiazine-5-dioxide forms stout small rods with M.P. 147–148° C.

When 7.9.10-trichloro-6-dibenzene(c,e)-o-thiazine-5-dioxide is reacted with dimethyl sulfate or diethyl sulfate, according to the method described in Example 4a, there are obtained:

7.9.10-trichloro-6-dibenzene(c,e)-6-methyl-o-thiazine-5-dioxide with M.P. 225–28° C., and 7.9.10-trichloro-6-dibenzene(c,e)-6-ethyl-o-thiazine-5-dioxide with M.P. 193–194° C. (from glacial acetic acid), respectively.

When in place of 1-bromobutane, allyl chloride is employed as the alkylating agent, there is formed 7.9.10-trichloro - 6 - dibenzene(c,e) - 6-allyl-o-thiazine-5-dioxide in the form of wide small rods (from petrol) with M.P. 152–153° C.

Example 4

On reaction of 220 parts by weight of 2-nitrobenzene-sulfonic acid chloride with a solution of 195 parts by weight of 3-trifluoromethyl-4-chloroaniline in 250 parts by weight of pyridine according to the method described in Example 2, there is obtained 2′-nitrobenzene-sulfonyl-3-trifluoromethyl-4-chloroanilide in crystalline form and at almost a quantitative yield (M.P. 153–155° C. after recrystallization). The product is reduced by stannous chloride in solution in aqueous alcoholic hydrochloric acid, as described in Example 2, to 2′-amino-benzene-sulfonyl-3-trifluoromethyl-4-chloroanilide which melts at 121–122° C. after recrystallization from alcohol. On diazotization with sodium nitrite in an acidic medium, conversion of the diazonium salt to the corresponding sulfone-triazine by means of sodium acetate, and boiling the last product in alkaline solution with added copper powder, there is obtained 10-trifluoromethyl-9-chloro-6-dibenzene(c,e)-o-thiazine-5-dioxide with M.P. 214–216° C. (after recrystallization from benzene).

*Analysis.*—F. calc.: 17.1%. Found: 17.4%.

Example 4a 5 parts by weight of 10-trifluoromethyl-9-chloro-6-dibenzene(c,e)-o-thiazine-5-dioxide are dissolved in 100 parts by volume of water by addition of sodium hydroxide solution. Approximately the calculated amount of dimethyl sulfate is added dropwise to the resultant solution, the methylated product separating in the form of a solid. When no more starting material can be detected by acidification of the filtrate from a filtered sample, the separated precipitate is filtered off by suction, rinsed with water, and recrystallized from petrol. 10-trifluoromethyl-9 - chloro-6-dibenzene(c,e)-6-methyl-o-thiazine-5-dioxide forms stout, colorless crystals with M.P. 166–167° C.

Example 5

The trichloro-derivative obtained by chlorination of 6-dibenzene(c,e)-o-thiazine-5-dioxide in an inert solvent is methylated with dimethyl sulfate, as described in Example 4a. There are obtained crystals with M.P. 75–78° C.

Example 6

33.5 parts by weight of 7.9.10-trichloro-6-dibenzene-(c,e)-o-thiazine-5-dioxide are heated at 120–130° C. (bath temperature) for several hours with 24 parts by weight of p-toluenesulfonic acid β-chloroethyl ester and 40 parts by volume of 10% sodium hydroxide solution. After cooling, it is diluted with water, sodium hydroxide solution is added until the reaction is definitely alkaline, and it is filtered off by suction.

The residue is rubbed with a mixture of acetone, water, and sodium hydroxide solution, filtered off with suction, washed with water, and the resultant light grey crude product is recrystallized from petrol. 7.9.10-trichloro-6-dibenzene - (c,e) - 6 - β - chloroethyl-o-thiazine-5-dioxide forms colorless stout small rods with M.P. 176–177° C.

Example 7

7 parts by weight of 7.9.10-trichloro-6-dibenzene (c,e)-o-thiazine-5-dioxide are heated to boiling with 50 parts by volume of acetic anhydride. After cooling, the reaction mixture is poured onto ice, the separated precipitate is filtered off by suction, and it is recrystallized from glacial acetic acid. 7.9.10-trichloro-6-dibenzene(c,e)-6-acetyl-o-thiazine-5-dioxide forms colorless small leaves with M.P.

164–165° C. However, on recrystallization from petrol, it is obtained in the form of tough crystal aggregates.

By the same way but using instead of acetic acid anhydride propionic acid anhydride there may be obtained the corresponding 6-propionyl compound.

*Example 8*

In a glass flask equipped with stirrer and reflux condenser, an introduction for chlorine gas and a possibility for removing the gaseous hydrochloric acid there are introduced 100 parts of bis-phenylen-sultam suspended in 1000 parts of o-dichlorobenzene. After addition of 2 parts of ferric chloride gaseous chlorine is introduced rapidly allowing the temperature to rise to 90° C. within 3½ hours. Thereafter at 90° C. further chlorine is introduced at said temperature, adding in intervals of 4–5 hours further 2 parts of ferric chloride.

According to the chlorination time and the amount of chlorine taken up mixtures of various chlorine content are obtained. If e.g. 650 parts of chlorine are taken up within 15 hours there are obtained 130–150 parts of a mixture of various chlorinated bis-phenylen-sultams with a chlorine content of 34%, indicating that about 3–4 chlorine atoms are present in the molecule.

To separate higher chlorinated bis-phenylen-sultams from a reaction mixture, chlorinated for still longer periods, the reaction mixture is cooled, the solid products are filtered off and washed with toluene. For further purification of the residue it is washed with diluted hydrochloric acid, suspended in 2000 parts of water and sodium hydroxide is added until the reaction is alkaline against triazine, at least for ½ hour at a temperature between 70+60° C. The sodium salt is filtered off, suspended in 200 parts of water and by addition of hydrochloric acid the free acid form is obtained again. This is washed with water and dried at about 100° C. in vacuum.

The lower chlorinated reaction products being present in the o-dichloro-benzene mother liquor, after distilling off the solvent may be purified by the method described before.

*Example 9*

100 parts by weight of bis-phenylene-sultam and 1000 parts of o-dichloro-benzene are mixed and 2 parts of ferric chloride are added. There are added at 20–30° C. within 8 hours 472 parts by weight of bromine, whereby care is taken for good stirring. After 4 hours again 2 parts of ferric chloride are added and the reaction is completed, by stirring for 12 hours at 20° C. Dry air is blown through the reaction mixture for 1 hour and the solid bromination brought is filtered off thereafter. Further purification is carried out as described in the foregoing example. A brominated product containing about 40% of bromine is isolated.

By nitration of the bis-phenylen-sultam with a mixture of sulfuric and nitric acid there may be obtained the dinitro-bis-phenylen-sultam.

*Example 10*

(a) 231 parts by weight of bis-phenylen-sultam are dissolved in 250 parts of water by addition of 89 parts of sodium hydroxide solution of 45%. Within 1 hour there are added at 50° C. 245 parts of 3.4-dichloro-benzene-sulfonyl-chloride. Stirring is continued for 6 hours. The reaction product thereafter is isolated by distillation, washed with 1000 parts of water and dried thereafter at 110° C.

(b) 80 parts of N-(3.4-dichlorophenylen-sulfonyl)-bis-phenylen-sultam are suspended in 1000 parts of dichlorobenzene and after adding 2 parts of ferric chloride there are introduced slowly at 30 to 50° C. 350 parts of gaseous chlorine. Thereafter, the reaction mixture is cooled to 10° C. and kept for 12 hours. Thereafter the chlorination product which crystallized is filtered off with suction, washed with 400 parts of toluene and dried in vacuum at 80° C. This reaction product contains between 31 and 32% of chlorine.

By the same way there may be obtained the N-(phenyl-sulfonyl)-bis-phenylen-sultam.

We claim:

1. The compound of the following formula

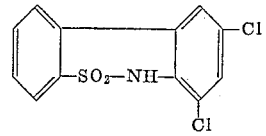

2. The compound of the following formula

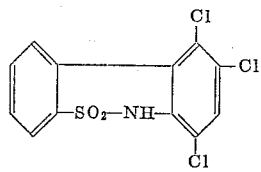

3. The compound of the following formula

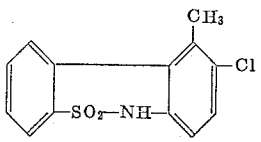

4. The compound of the following formula

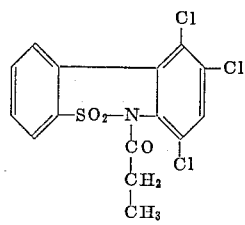

5. A compound of the formula

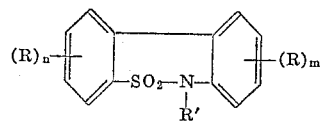

in which R is a member selected from the group consisting of halo, nitro and trifluoro-methyl; R' is a member selected from the group consisting of lower alkyl, lower alkanoyl, phenyl-sulfonyl, and halo-phenyl-sulfonyl; and $m$ and $n$ are integers of 1–4.

6. A compound of the formula

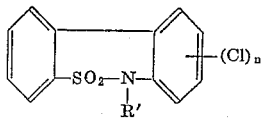

R' is a member selected from the group consisting of hydrogen and ethyl carbonyl; $n$ being an integer of 1–3 when R' is hydrogen and 3 when R' is ethyl carbonyl.

7. A compound of the formula
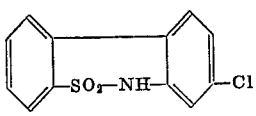
8. A compound of the formula
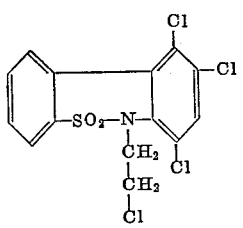
9. A compound of the formula
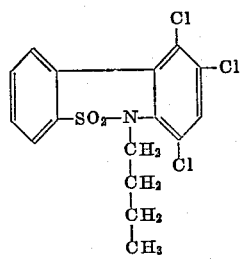
No references cited.
WALTER A. MODANCE, *Primary Examiner.*
IRVING MARCUS, *Examiner.*